UNITED STATES PATENT OFFICE.

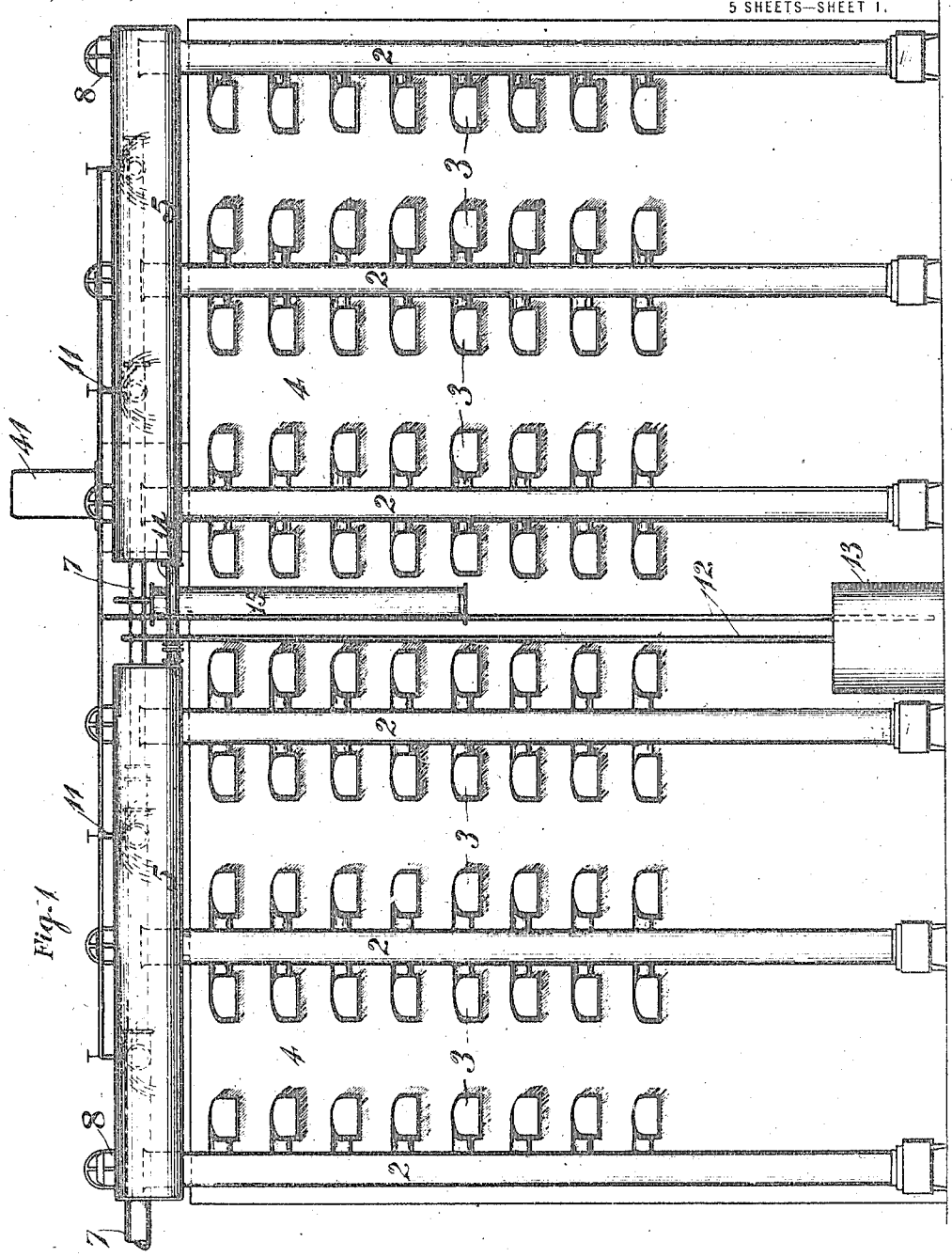

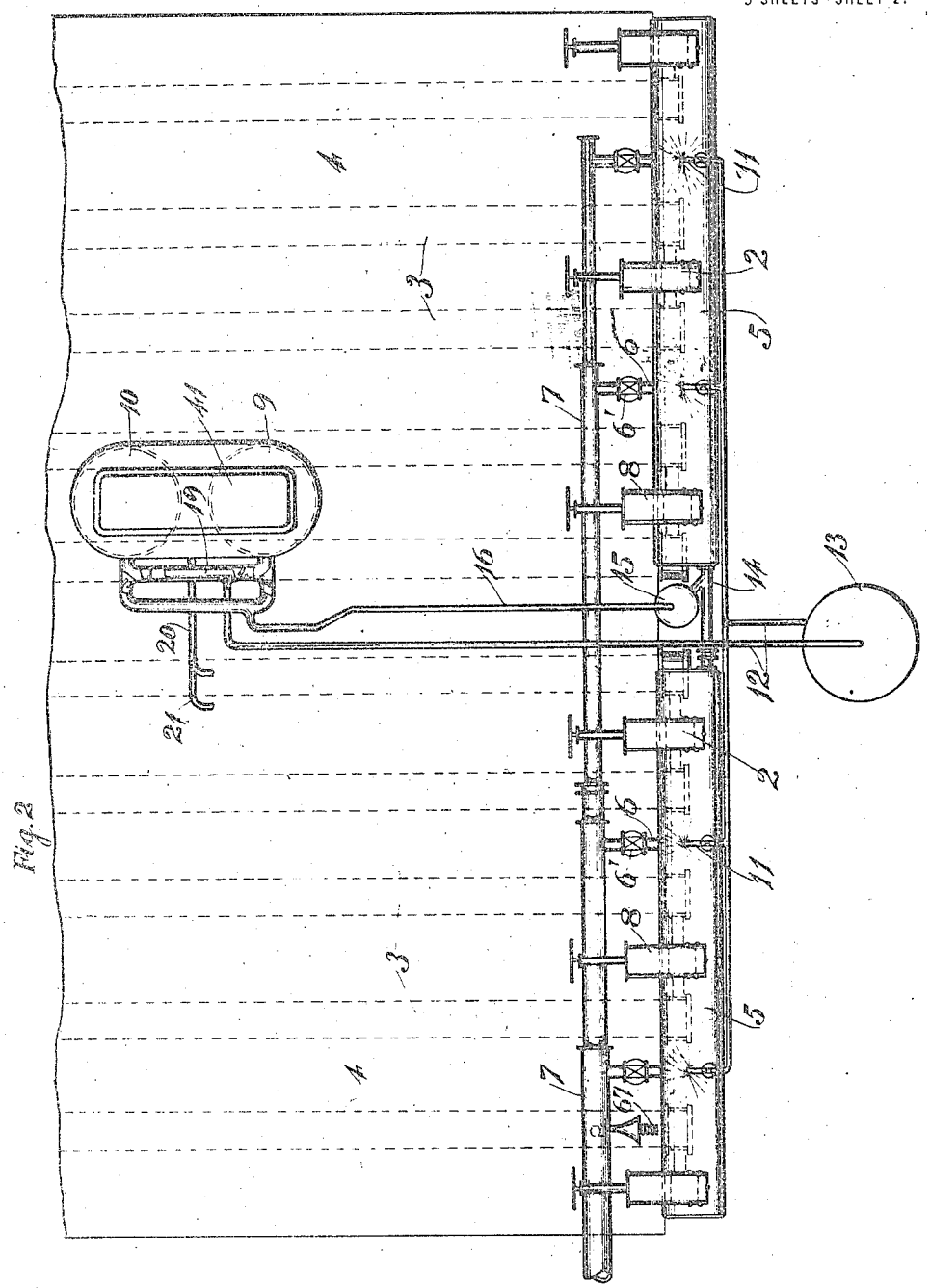

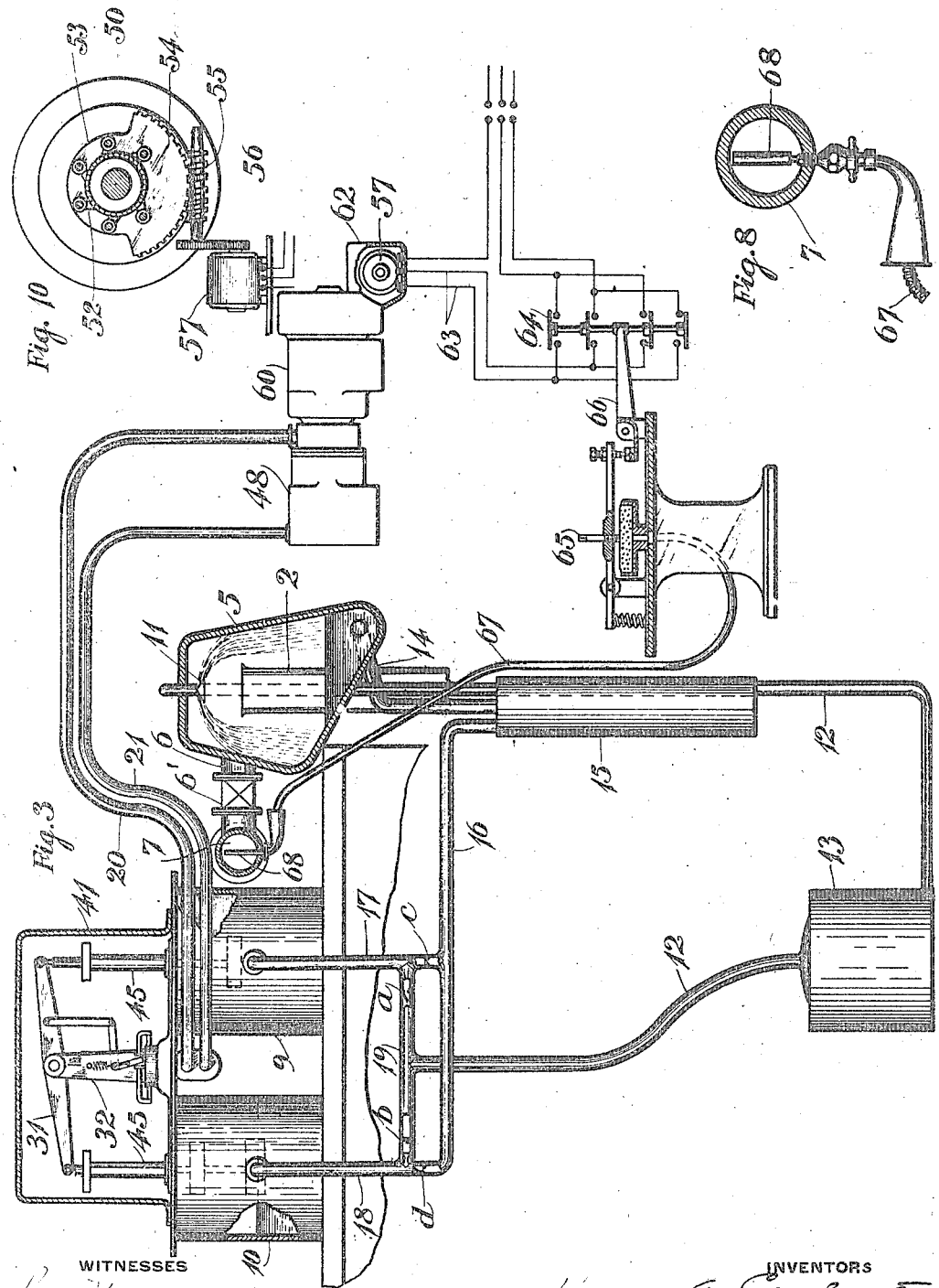

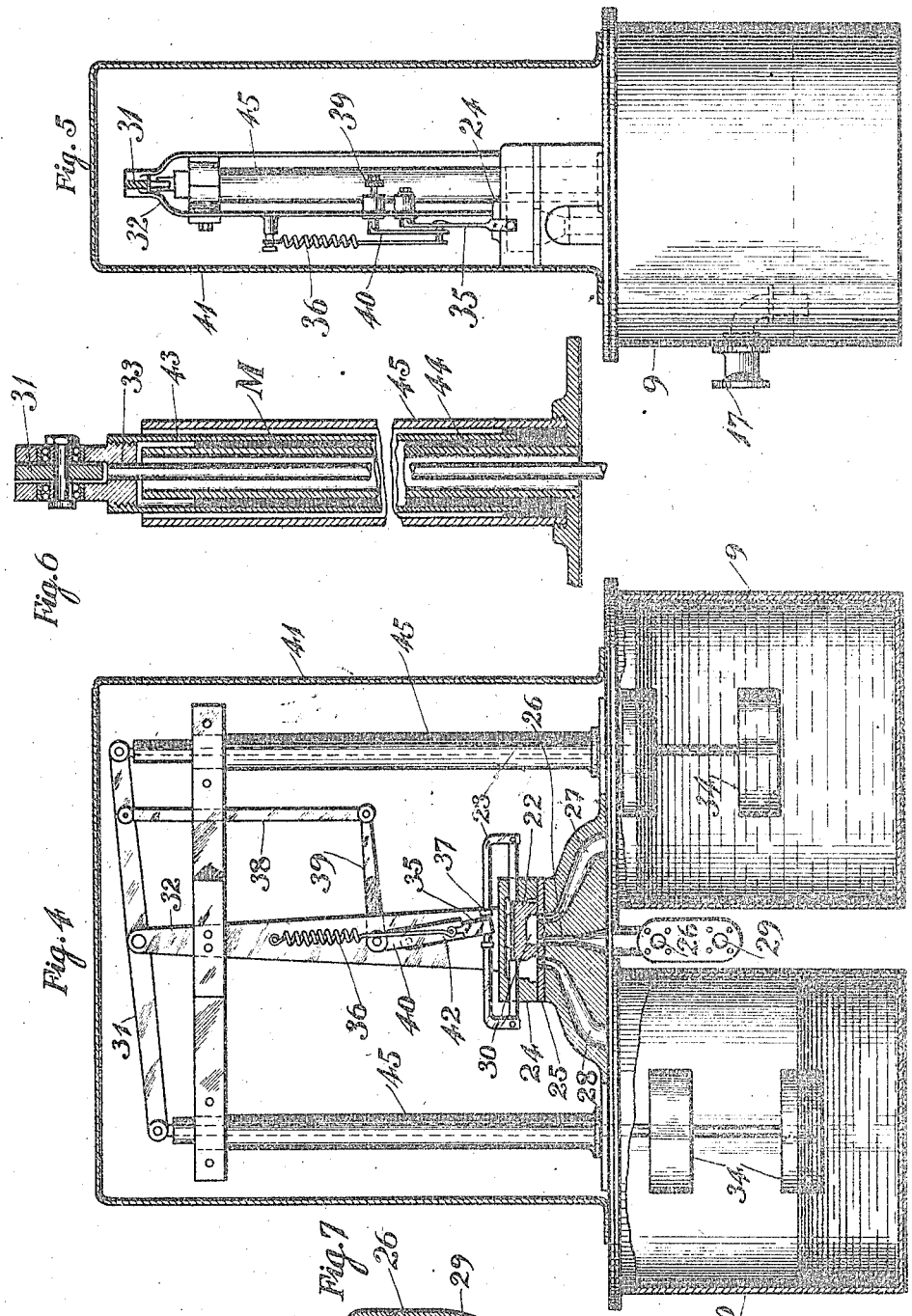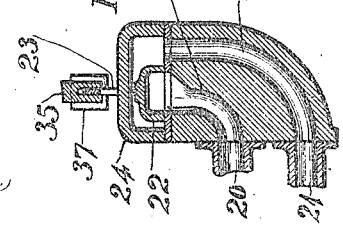

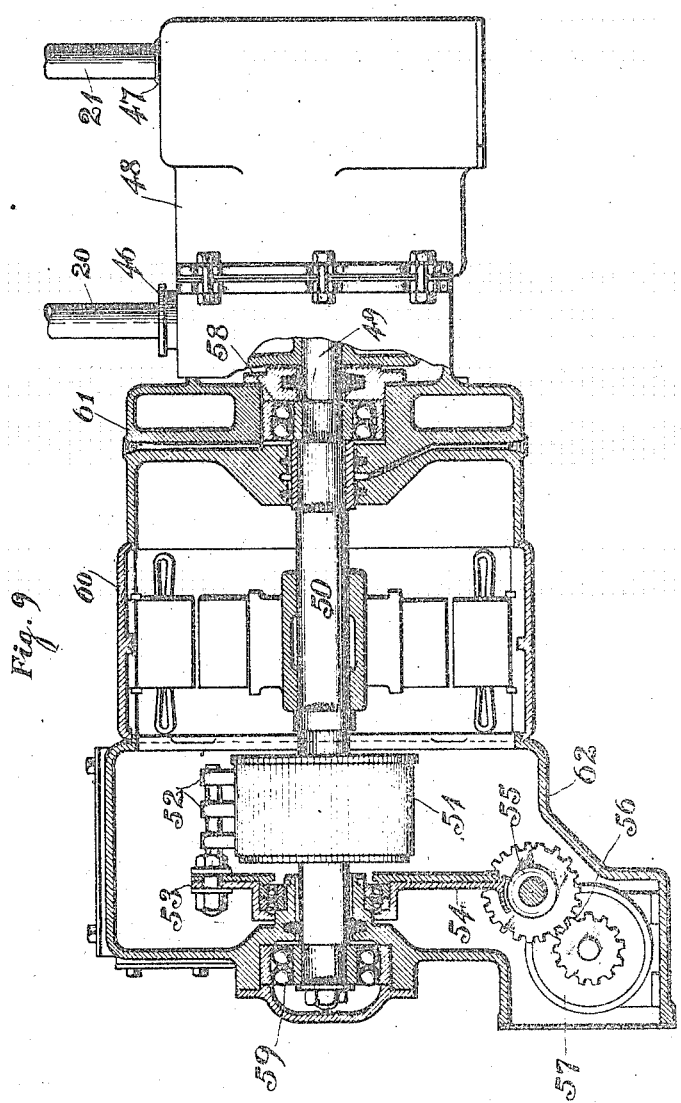

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF PENNSYLVANIA.

APPARATUS FOR TREATING COAL-GAS.

1,169,615.

Specification of Letters Patent. Patented Jan. 25, 1916.

Application filed February 9, 1915. Serial No. 7,037.

*To all whom it may concern:*

Be it known that we, HENRY A. CARPENTER and ARTHUR W. WARNER, citizens of the United States, residing at Sewickley, in the county of Allegheny and State of Pennsylvania, have invented certain new and useful Improvements in Apparatus for Treating Coal-Gas, of which the following is a specification.

This invention relates to the purifying of coal gas during its passage from the generator to the offtake main, and consists primarily of improved means for cooling the gas and thereby precipitating the heavier hydrocarbons such as tar, naphthalene, etc., before these adulterating and stoppage-forming substances can pass to the main and apparatus beyond, thereby eliminating much of the stoppage heretofore experienced and decreasing the work of those portions of the apparatus or system to which the gas is delivered.

The invention has particular reference to improved and highly efficient means for maintaining uninterrupted circulation of the cooling and cleansing liquid, the flow being maintained by air or other gaseous fluid manipulated by a pump in such manner as to cause the requisite flow or circulation without subjecting the liquid to the usual mechanical pumping process, the manipulation of the present invention being more advantageous than the former practice because of the presence of substances in the liquid which tend to interfere with or obstruct the ordinary pumping operation, and because of the facility with which the flow of liquid may be accurately controlled.

A further object is to utilize the temperature of the gas for automatically controlling the flow of the cleansing liquid, the flow increasing with increasing temperature in such manner as to cool and deliver the gas to the offtake at a substantially uniform temperature regardless of temperature variations before the gas is subjected to the cooling process, thereby insuring uniform precipitation of the stoppage-forming impurities. In the adaptation herein disclosed this automatic regulation is accomplished by utilizing the temperature of the gas through the medium of a thermostat for determining the rate of flow of the cooling liquid.

A further characteristic of the invention is the arrangement of the cooling liquid containers and the spraying mechanism in substantially the same horizontal plane, thereby minimizing the pumping force required for maintaining the requisite circulation.

In connection with the air manipulation a further feature is the employment of an air pump which is directly connected to an electric motor, the motor being inclosed in an air and gas-tight casing or jacket whereby danger of fire and explosion from sparking of the motor are eliminated.

The invention also includes improved means for alternating the simultaneous filling and emptying of two liquid containers which are included in the circulation system, one container discharging while the other is filling, and vice-versa, the liquid levels in the containers operating to automatically reverse these operations without interfering with the continuity of the flow.

In the accompanying drawings, Figure 1 is a front elevation of gas generating apparatus to which the invention is applied, and Fig. 2 is a view in top plan of the same. Fig. 3 is a diagrammatic view of the improved apparatus illustrating the various devices and connections which enter into the circulation system. Fig. 4 is a view of a pair of tanks or containers, shown partly in elevation and partly in section, from one of which the cooling medium is discharged into the circulation system and to the other of, which the liquid is returned from the system, the view also illustrating the reversible valve mechanism associated with the tanks. Fig. 5 is an elevation taken at right angles to Fig. 4, the upper inclosing casing being showing in section. Fig. 6 is a vertical section of the pitman and pitman seal shown at the lefthand side of Fig. 4. Fig. 7 is a vertical section through the center of the reversible valve and valve connections, taken at right angles to Fig. 4. Fig. 8 is a sectional detail showing the connection between the gas-exposed extremity of the thermostat and the main. Fig. 9 is a view of the pump, pump-actuating motor, and auxiliary or governing motor, the same being shown partly in section and partly in elevation. Fig. 10 is a diagrammatic view of a portion of the pump-actuating motor, together with the auxiliary or governing motor.

The invention herein may be utilized in connection with various forms of apparatus for delivering gas from the generators or retorts to the offtake main. The delivering apparatus herein disclosed, which is the invention of Henry A. Carpenter and is claimed in his application filed August 6, 1914, Serial No. 855,415, consists of stand-pipes 2 into each of which is discharged the gas from a vertical series of retorts 3 arranged in benches 4, with the upper ends of the stand-pipes entered in the containers or cooling chambers 5 from which lead outlet pipes 6 to the offtake main 7. Chambers 5 are preferably formed in units each of sufficient length and capacity to serve two or three stand-pipes, whereby the product of a relatively large number of retorts is thoroughly mixed and cooled and the heavier hydrocarbons precipitated before passing to the offtake main. Each container 5 is preferably provided with at least two outlets 6 leading to the main, each of which is valved at 6' to so regulate and control the outflow from different portions of the container as to maintain uniformity in the temperature and quality of the gas passing to the offtake. Valved outlets 8 in chambers 5 above and in line with the stand-pipes afford access to the latter for cleaning, etc.

In its broader aspect the invention simply requires a container, chamber or passage which is traversed by the gas in passing from the generators or retorts and in which it may be cooled with the resulting precipitation of impurities, and hence it will be understood that the invention is not restricted to the particular embodiment of gas passage, container, or cooling chamber, herein disclosed. The container or cooling chamber, in the present adaptation chamber 5 is included in a closed liquid circulation system, the advantages of which are well understood in the art. By means thereof much ammonia is saved as compared with an open or fresh-water circulation, for after the cooling medium has become saturated no additional ammonia is extracted from the gas, and the fully saturated liquid is quite as effective for cooling the gas as pure or fresh water would be.

The circulation system includes two closed tanks or reservoirs 9 and 10. The liquid is discharged into the upper portion of each container 5 through a series of sprayers 11, being conducted thereto from one or the other of tanks 9 and 10 through pipe 12, a cooler 13 of conventional form being included in pipe 12 for reducing the temperature of the liquid to the desired degree in its passage to sprayers 11. The liquid collects in the lower portion of container or chamber 5 beneath the upper extremities of the stand-pipes and hence cannot flow into the latter. Sprayers 11 are so disposed as not to discharge into the stand-pipes, without, however, interfering with a full and thorough spraying and cooling of the gas which results in precipitating the tar and other heavier hydrocarbons held in suspension by the gas as it flows from the stand-pipes. The fluid laden with the precipitated impurities discharges from container 5 through pipe 14 of the circulation system into a tar separator and collector 15 of conventional form, and from the latter through pipe 16 to tank 9 or 10.

The liquid is caused to circulate by withdrawing air from the upper portion of one of the tanks and thereby inducing an inward flow of liquid and simultaneously forcing air into the upper portion of the other tank and causing the liquid to flow therefrom. In the adjustment shown in the drawings, tank 9 is discharging its liquid contents and tank 10 is filling. Each tank empties and fills alternately through pipes 17 and 18, respectively, said pipes connected by pipe 19 for the forward or outward flow through pipe 12, and with both of said pipes connected to pipe 16 for the inward or return flow. The oppositely opening check valves $a$ and $b$ in pipe 19 are automatically controlled by the pressure and suction forces for maintaining communication between outflow pipe 12 and the discharging tank 9 or 10, and for closing communication between pipe 12 and the tank which is filling. Similarly, corresponding check valves $c$ and $d$ close the inlet pipe 16 to the discharging tank and open said pipe to the tank which is filling.

Air under pressure for causing the cooling liquid to circulate is admitted to the discharging tank 9 or 10 through pipe 20 and is withdrawn from the charging or filling tank through pipe 21, these pipes being connected, respectively, to the outlet and intake of an air pump, as will be presently described. For controlling communication between the said air pipes and tanks 9 and 10, a slide valve 22 provided with an operating rein 23 is mounted in chest 24 in which the valve seat 25 is formed with three ports which aline with each other longitudinally of the chest. The central port 26 is in communication with air inlet pipe 20, and ports 27 and 28 at opposite sides of port 26 are, respectively, in communication with tanks 9 and 10. A port 29 maintains the air outlet pipe 21 in constant communication with the steam chest at the exterior of valve 22. The under side of the slide valve is ported at 30 to maintain communication between port 26 and either of ports 27, 28 with the other of said ports in unobstructed communication through the steam chest with the air outlet port 29 and pipe 21.

The slide valve is reversed for reversing the action tanks 9 and 10 by displacement devices within each tank which are acted upon by the liquid and which transmit the valve-shifting movement at the proper times through the medium of a walking beam 31. This beam is centrally mounted on an upright 32, with rods 33 depending from opposite ends thereof into the respective tanks, with displacement heads 34 secured to each rod. While these heads perform, in a measure, the function of floats, they are preferably formed of solid metal, the two sets so balancing each other and their displacement action in the liquid being such as to render them quite as effective as floats, without, however, subjecting the apparatus to the danger of break-down resulting from a leaky or otherwise impaired float. As tank 9 empties with a corresponding filling of tank 10, the lowering tendency of displacement heads in tank 9 and the corresponding semi-buoyancy of the heads in tank 10 causes the sets to shift their position in such manner that when there has been sufficient emptying of one tank and filling of the other the displacement action rocks beam 31 and thereby shifts the valve by the means which will now be described.

The pivoted snap arm 35 is under the constant upward pull or tension of spring 36, the arm having a sufficiently loose or compensating connection with the valve rein 23, as indicated at 37, to permit the arm to move to center position in response to the movement of the walking beam without disturbing the valve, but upon passing the center line spring 36 causes a snap motion which immediately and completely throws the valve to the opposite adjustment. For transmitting the valve-shifting motion from the walking beam a link 38 depending therefrom is connected to one arm 39 of the bell-crank 40, the depending arm of this bell-crank being connected to the valve-shifting arm 35 at 42.

To maintain tanks 9 and 10 air and gas tight and thereby prevent leakage of the saturated liquid forcing or impelling air, each pitman rod 33 is inclosed in an open-bottom tube 43 which is adapted to move vertically between the fixed separated inner and outer tubes 44 and 45 supported by the tank, a column of mercury M being confined in the space in which tube 43 works, with the result that an air and gas tight seal is always maintained between each pitman 33 and the tank from which it projects. This arrangement eliminates friction and the seal maintaining uncertainties incident to an ordinary stuffing box. A casing 41 incloses the walking beam and other parts of the valve-shifting mechanism.

The air circulation pipes 20 and 21 lead, respectively, from the outlet 46 and inlet 47 of a centrifugal air pump 48 of usual or any preferred construction which may be located in any convenient part of the plant. This pump is preferably directly connected to the extended portion 49 of an electric motor armature shaft 50. 51 is the commutator of the motor, and 52 are the shifting or adjustable commutator brushes, the position or adjustment of which determine the speed of the motor and consequently the speed of the air pump. The commutator brushes 52 are mounted on the brush carrier 53 which is adapted to oscillate on the armature shaft, as here shown carrier 53 being provided with a cogged segmental portion 54 with which meshes worm 55, the latter in turn being geared at 56 to the small regulating electric motor 57. This motor determines the position of brush shifter 53, causing the pump operating motor to run faster or slower depending on the requisite rate of flow of the cooling liquid.

Motor shaft 50 is provided with bearings 58 and 59 in opposite ends of the motor inclosing frame 60, frame end 61 in which bearing 58 is located completely isolating the motor from the pump which latter is preferably extended from and supported by frame end 61. Frame 60 is constructed with an extension or enlargement 62 which incloses the brush shifter and its motor 57. With frame 60 and its extension 62 air and gas tight, combustible vapors from pump 48 or other sources are excluded, thereby eliminating all danger of fire or explosion which otherwise might be caused by sparking of the motors.

For intermittently and automatically controlling the operation of motor 57 in order to move the brush shifter in one direction or the other or to maintain it stationary, the circuits 63 for motor 57, preferably of three-phase arrangement, are controlled by the reversing switch 64 which in its extreme positions causes motor 57 to operate in one direction or the other, while when the switch is in intermediate position (the adjustment shown in Fig. 3) the circuits are open and the motor is at a standstill. The arrangement of the motor circuits and the details of the switch are shown only conventionally as they form no part of the present invention and specific description and illustration are deemed unnecessary.

Thermostatic mechanism 65, preferably of Taglibue type, is utilized for operating switch 64, the force for shifting the switch being transmitted thereto through pivoted arm 66. A flexible actuating connection 67 for the thermostat has its sensitive extremity 68 exposed to the gas, preferably within main 7 and beyond the last lateral outlet 6, as shown in Fig. 2, whereby the regulating temperature is a composite of the temperatures of all the gas delivered to the main. Obviously, extremity 68 may be arranged at any other point where a substantially uniform temperature condition is to be maintained.

With the air circulating apparatus arranged as above described, it is controlled by the temperature of the gas, the thermostat actuating the switch 64 in such manner as to so control motor 57 as to cause the pump driving motor to run at increased or decreased speed, or to maintain a desirable speed, all as determined by the gas cooling demands upon the apparatus. With an increasing or rising temperature of the gas discharging into the main, the action of the thermostat will result in a more rapid or copious flow of the cooling liquid from the sprayers, and a reverse action will result upon lowering of the gas temperature.

We claim:—

1. The combination of a gas container, a closed liquid circulation system in which the container is included and with the liquid adapted to pass through the container and in contact with the gas, means for maintaining circulation of the liquid through the closed system, and temperature-controlled means for determining the rate of flow of liquid through the system.

2. The combination of a gas container, a cooling-liquid inlet for the container and means for inducing an inflow of liquid therethrough, a gas inlet and a gas outlet for the container, means controlled by the temperature of the cooled gas for determining the flow of the cooling liquid, and a liquid outlet for the container.

3. The combination of a gas container, a retort-bench stand-pipe adapted to discharge gas into the container, means for discharging gas-cooling liquid into the container, and a thermostat in the path of the gas for regulating the flow of the cooling liquid.

4. The combination of a gas container, a retort-bench stand-pipe adapted to discharge gas into the container, means for discharging gas-cooling liquid into the container, and means controlled by the temperature of the cooled gas for regulating the flow of the cooling liquid.

5. The combination of a gas container, means for subjecting the gas to a flowing cooling fluid, a thermostat under the influence of the gas, and variable flow-inducing means for the cooling fluid operatively connected to and regulated by the thermostat.

6. The combination of a gas container, means for subjecting the gas to a flowing cooling fluid, a thermostat under the influence of the gas, a variable speed pump for inducing a flow of the cooling fluid, mechanism for varying the speed of the pump, and means operatively connecting the thermostat and said speed-varying mechanism for automatically adjusting the latter.

7. The combination of a gas container, a closed circulation system for passing a cooling fluid to and from the container, a variable speed pump for maintaining fluid circulation through said system, and means controlled by the temperature of the gas for automatically regulating the speed of the pump.

8. The combination of a gas container, means for subjecting the gas to a flowing cooling fluid, means for inducing variable flow of the cooling fluid, and means controlled by the temperature of the gas and operatively connected to the flow-inducing means for determining the speed of the latter.

9. The combination of a gas container, means for subjecting the gas to a fluid cooling medium, a variable speed pump for inducing variable flow of the cooling medium, an electric motor for regulating the speed of the pump, electric circuits connected to the motor for driving the same in reverse directions, and means controlled by the temperature of the gas for controlling the current flow to the motor.

10. The combination of a gas container, means for subjecting the gas to a cooling fluid, a pump for impelling the cooling fluid, an electric motor for driving the pump, shifting brushes for the motor for varying the speed of the latter, brush-shifting means, and a thermostat under the influence of the gas and operatively connected to the brush-shifting means.

11. The combination of a gas container, means for subjecting the gas to a cooling fluid, a pump for impelling the cooling fluid, an electric motor for driving the pump, shiftable brushes for varying the speed of the motor, an electric motor for shifting the brushes, means for reversing the current flow to the last mentioned motor, and means controlled by the temperature of the gas for controlling the current flow reversing means.

12. The combination of a gas container, means for subjecting the gas to a cooling liquid, means for subjecting the liquid to air pressure for impelling the same, a variable drive pump for the liquid-impelling air, and means actuated by variations in temperature of the gas for varying the speed of the pump.

13. The combination of a gas container having an inlet and an outlet for cooling liquid, means for inducing a flow of cooling liquid through the container, a gas inlet and a gas outlet for the container, and temperature controlled means under the influence of the gas for automatically regulating the flow of the cooling liquid.

14. The combination of a gas container, a closed liquid circulation system in which the container is included and with the liquid adapted to pass and repass through the container and in contact with the gas, means for maintaining circulation of liquid through the closed system, and temperature controlled means under the influence of the gas for automatically regulating the flow of the cooling liquid.

15. The combination of a gas container, two tanks for a cooling fluid, means for connecting the tanks interchangeably to the gas container for discharging thereinto, means for draining the liquid from the gas container interchangeably into the tanks, one tank being adapted to fill as the other empties and vice versa, means for reversing the direction of the liquid flow to and from the respective tanks, and flow-inducing means.

16. The combination of a gas container, two tanks for a cooling liquid connected to and adapted alternately to discharge into the gas container, means for conducting cooling liquid from the gas container alternately to one and then the other tank, means for inducing a flow of liquid, and means actuated by the liquid within the tanks for simultaneously reversing the liquid outflow and inflow thereof.

17. The combination of a gas container, two tanks for a cooling liquid connected to the gas container for alternately discharging thereinto, means for conducting the liquid from the gas container to the tanks alternately, the fluid connections being arranged to discharge the liquid from one tank and simultaneously conduct the liquid from the gas container to the other tank and vice versa, liquid impelling means common to the two tanks, and means controlled by the contents of the said tanks for reversing the action of the fluid impelling means.

18. The combination of a gas container, two tanks for a cooling liquid with connections between said tanks and the gas container for discharging liquid interchangeably from the former into the latter, connections between the tanks and gas container for discharging the liquid interchangeably from the former into the latter, means for forcing air into one tank and for simultaneously withdrawing air from the other tank, and means for reversing the action of the air forcing means.

19. The combination of a gas container, two tanks for a cooling liquid, connections between the tanks and the container for discharging liquid interchangeably from the tanks into the container, connections between the tanks and container for discharging the liquid interchangeably from the container into the tanks, means for forcing air into one tank and for simultaneously withdrawing air from the other tank, and means controlled by the quantity of liquid in the tanks for reversing the action of the air-forcing means.

20. The combination of a gas container, two tanks for a cooling liquid, connections between the tanks and the container for discharging liquid interchangeably from the tanks into the container, connections between the tanks and container for discharging the liquid interchangeably from the container into the tanks, means for forcing air into one tank and for simultaneously withdrawing air from the other tank, a reversible valve for reversing the action of the air in the respective tanks, a displacement device movable in each tank and actuated by the liquid therein, and means operatively connecting the displacement devices to the valve for shifting the latter.

21. The combination of a gas container, two tanks for a cooling liquid, connections between the tanks and the container for discharging liquid interchangeably from the tanks into the container, connections between the tanks and container for discharging the liquid interchangeably from the container into the tanks, means for forcing air into one tank and for simultaneously withdrawing air from the other tank, a reversible valve for reversing the action of the air in the respective tanks, a displacement device movable vertically in the liquid of each receiver, a walking-beam connection between the displacement devices, and an operative connection between the walking beam and the reversing valve.

22. The combination of a gas container, two tanks for a cooling liquid, connections between the tanks and the container for discharging liquid interchangeably from the tanks into the container, connections between the tanks and container for discharging the liquid interchangeably from the container into the tanks, means for forcing air into one tank and for simultaneously withdrawing air from the other tank, a reversible valve for reversing the action of the air in the respective tanks, a fluid actuated device movably mounted in each tank, an operative connection between said devices whereby each reacts on the other, and a compensating snap connection between said connecting means and the valve whereby predetermined movement of said fluid actuated devices operates to shift the valve.

In testimony whereof, we affix our signatures in presence of two witnesses.

HENRY A. CARPENTER.
ARTHUR W. WARNER.

Witnesses:
M. J. STEELE,
ADA M. STEELE.